United States Patent
Hou et al.

(10) Patent No.: US 8,101,016 B2
(45) Date of Patent: Jan. 24, 2012

(54) PRECAST CONCRETE COMPONENT MATERIAL MIXTURE AND METHOD OF PRECASTING

(75) Inventors: Pi-Sung Hou, Kaohsiung (TW); Hsi-Yi Hsieh, Kaohsiung (TW); Chao-Lung Hwang, Taipei (TW); Chun-Tsun Chen, Taipei County (TW)

(73) Assignee: China Steel Corporation, Kaohsiung (TW)

( * ) Notice: Subject to any disclaimer, the term of this patent is extended or adjusted under 35 U.S.C. 154(b) by 220 days.

(21) Appl. No.: 12/570,387

(22) Filed: Sep. 30, 2009

(65) Prior Publication Data

US 2010/0237158 A1   Sep. 23, 2010

(30) Foreign Application Priority Data

Mar. 20, 2009 (TW) .............................. 98109215 A

(51) Int. Cl.
  C04B 14/48 (2006.01)
  C04B 16/00 (2006.01)
  C04B 22/04 (2006.01)
  C04B 7/14 (2006.01)
  C04B 7/19 (2006.01)
  C04B 11/00 (2006.01)
  C04B 28/14 (2006.01)
  C04B 14/00 (2006.01)
  C04B 24/00 (2006.01)
  C04B 5/00 (2006.01)
  C04B 14/40 (2006.01)
  C04B 2/00 (2006.01)
  C04B 28/10 (2006.01)

(52) U.S. Cl. ........ 106/644; 106/714; 106/728; 106/505; 106/624; 106/797; 106/737; 238/264

(58) Field of Classification Search .................. 238/264
  See application file for complete search history.

(56) References Cited

U.S. PATENT DOCUMENTS 6,402,831 B1 *  6/2002  Sawara et al. ................. 106/738

* cited by examiner

*Primary Examiner* — Jerry A Lorengo
*Assistant Examiner* — Karam Hijji
(74) *Attorney, Agent, or Firm* — Muncy, Geissler, Olds & Lowe, PLLC

(57) ABSTRACT

A precast concrete component material mixture and method of precasting, which is used to manufacture sleepers for transportation tracks, and related precast concrete components, are provided. The precast concrete component material mixture include: 891 to 963 kg/m$^3$ of coarse aggregate(ca); 811 to 876 kg/m$^3$ of fine aggregate(fa); pozzolan material containing 90 to 97 kg/m$^3$ of fly ash and 31 to 34 kg/m$^3$ of silica fume; cementing material containing 235 to 350 kg/m$^3$ of cement and 78 to 117 kg/m$^3$ of blast furnace slag; 122 to 165 kg/m$^3$ of water; carboxylic acid superplasticizer, which is 0.7 to 2.0 wt % of the total usage of the pozzolan and cementing material; and steel fiber accounting for 0.5 to 1.0% of the total volume.

7 Claims, 4 Drawing Sheets

PRECAST CONCRETE COMPONENT MATERIAL MIXTURE AND METHOD OF PRECASTING

CLAIM FOR PRIORITY

This application claims the benefit of Taiwan Patent Application No. 098109215, filed on Mar. 20, 2009, which is hereby incorporated by reference for all purposes as if fully set forth.

BACKGROUND OF THE INVENTION

1. Field of Invention

The present invention relates to a precast concrete component material mixture and method of precasting, and more particularly to the usage amount of precast component material and method of precasting of high strength and high durable performance concrete sleepers.

2. Related Art

In transportation track systems of the prior art, the straight lines and rail switch sections use wooden sleepers, especially the sleepers of railway switch sections. Moreover, be produce of the special structure of the fasteners, when a train passes the rail switches, the dynamic behavior of the sleeper is complicated, and up to the present time, wooden sleepers are still being laid for traveling on. However, in recent years, there has been an upward surge in environmental consciousness, and obtaining wooden blocks has tended to become difficult; moreover, the purchase price is also increasing yearly, and the operational life has gradually decreased. Hence, current straight lines are already using precast prestressed concrete sleepers as a replacement for wooden sleepers. However, beproduce stress and dynamic behavior of straight lines differ from the rail switch sections, since the strength of the existing precast prestressed concrete sleepers used is relatively lower, and such sleepers are not suitable for use on rail switch road sections, especially the sleepers used on railroads of domestic and foreign iron and steel works, which demand much higher performance. Hence, there is the need for additional research and development of precast prestressed concrete sleepers with high strength, high durability and high ductility for use on rail switches.

SUMMARY OF THE INVENTION

In light of the above, and wanting to resolve the aforementioned problems of the prior art, the present invention provides a precast concrete component material mixture and method of precasting to control concrete quality using precise qualitative and quantitative mixture design methods, reducing cement usage and carbon dioxide emission, as well as providing precast concrete component material with ultra-high performance.

In order to resolve the aforementioned problems of the prior art, the technological means for precast concrete component material mixture of the present invention provides precast component material suitable for use in sleepers and related component material, comprising: 891 to 963 kg/m³ of coarse aggregate(ca) and 811 to 876 kg/m³ of fine aggregate (fa), pozzolan material comprising 90 to 97 kg/m³ of fly ash and 31 to 34 kg/m³ of silica fume, cementing material comprising 235 to 350 kg/m³ of cement and 78 to 117 kg/m³ of blast furnace slag, 122 to 165 kg/m³ of water, carboxylic acid based superplasticizer accounting for 0.7 to 2.0 wt % of the total usage of pozzolan material and cementing material, and steel fiber accounting for 0.5 to 1.0% of the total volume.

In order to resolve the aforementioned problems of the prior art, the technological means for a method of precasting and computational mixture design method for material usage of precast concrete component material of the present invention provides a method of precasting for precast concrete component material, comprising: mixed coarse aggregate(ca) and fine aggregate(fa), which serve as the main framework of particles, to which is added the pozzolan material and cementing material; the pozzolan material comprises fly ash and silica fume, and the cementing material comprises cement and blast furnace slag. The pozzolan material is used to fill the void in the dense packed solid particles, and also produces a pozzolan reaction, while the blast furnace slag of the cementing material is used to reduce cement usage. Water and carboxylic acid based superplasticizer is then added, and the steel fiber is mixed in; two ends of the steel fiber are curved hooks, length-diameter aspect ratio lies between 50~70, and volume of steel fiber is less than 1% of the total volume.

The present invention is characterized in providing a precise theoretical calculation method as a basis, and sophistic concrete mixture design technology using precise qualitative and quantitative means to control concrete quality, thereby substantially reducing cement usage and carbon dioxide emission. The concrete material has application in sleepers of straight lines and rail switches, and can substantially improve the operational life of sleepers, demonstrating remarkable efficiency in reducing cost, saving energy, reducing carbon dioxide emission and protecting the environment. Moreover, the present invention has application in related precast component materials, providing a link in green materials, and is applicable for use in modern construction techniques.

To enable a further understanding of said objectives and the technological methods of the invention herein, a brief description of the drawings is provided below followed by a detailed description of the preferred embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
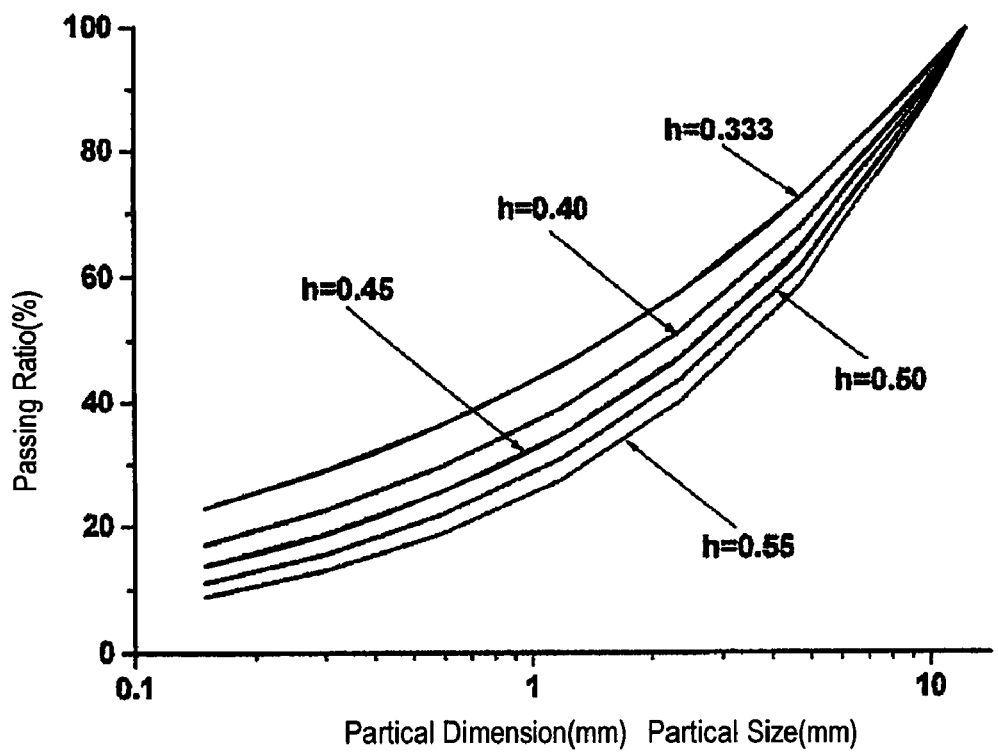
FIG. 1 depicts Fuller's ideal gradation curve (Fuller's curve).

The embodiment of a precast concrete component material of the present invention is applicable for use in structural materials, especially structural materials requiring high compressive strength, such as sleepers, and the like, wherein the material comprises: coarse aggregate(ca), which are normal weight aggregate, machine-made stone with maximum particle diameter of 12.5 mm (½") or 891 to 963 kg/m³ of fine aggregate(fa), which are normal aggregate, being machine-made sand of fineness modulus (F.M) lying between 2.8 to 3.2 or 811 to 876 kg/m³ of river sand material; pozzolan material, comprising 90 to 97 kg/m³ of fly ash, 31 to 34 kg/m³ of silica fume; cementing material, comprising 235 to 350 kg/m³ of cement and 78 to 117 kg/m³ of blast furnace slag. Total usage of the pozzolan material and cementing material is in the range between 444 to 588 kg/m³; 122 to 165 kg/m³ of water; carboxylic acid based superplasticizer, which is 0.7 to 2.0 wt % of the total usage of the pozzolan and cementing material; and steel fiber, two ends of which are curved hooks, and the aspect ratio lies between 50~70, and content of the steel fiber is 0.5 to 1.0% of the total volume. The compressive strength of the aforementioned concrete lies between 700 to 1,050 kgf/cm² (which is equivalent to 10,000 psi to 15,000 psi).

The embodiment is applicable for use in the manufacture of structural materials such as sleepers, and the like. Method of precasting for the precast concrete component material comprises: Using a mixture of coarse aggregate(ca) and fine aggregate(fa) as the main framework of the dense packed particles, then adding the pozzolan material and the cementing material. The pozzolan material comprises fly ash and silica fume, and the cementing material comprises cement and blast furnace slag. The pozzolan material is used to fill voids in the packed particles, and is also used to produce a pozzolan reaction, and the blast furnace slag of the cementing material enables reducing the cement usage. Water and the carboxylic acid based superplasticizer is then added, and the steel fiber mixed in. Two ends of the steel fiber are curved hooks, aspect ratio of the steel fiber lies between 50~70, and volume of the steel fiber is less than 1% of the total volume. Calculation of usage amounts in the mixture of each of the aforementioned materials is:

Matrix relational expression 1

$$\begin{bmatrix} W_{ca} \\ W_{fa} \\ W_{flyash} \\ W_{silica} \\ W_{cemen} \\ W_{slag} \\ W_{water} \\ W_{fiber} \end{bmatrix} = \begin{bmatrix} K_{sst} \cdot t & K_{sst} \cdot t & -\frac{1}{\gamma_{flyash}} & -\frac{1}{\gamma_{silica}} & -\frac{1}{\gamma_{cement}} & -\frac{1}{\gamma_{slag}} & -\frac{1}{\gamma_{water}} & K_{sst} \cdot t \\ K_{sst} \cdot t + \frac{1}{\gamma_{fa}} & K_{sst} \cdot t + \frac{1}{\gamma_{ca}} & 0 & 0 & 0 & 0 & 0 & K_{sst} \cdot t \\ 1 & -\frac{P_{w,1}}{P_{w,2}} & 0 & 0 & 0 & 0 & 0 & 0 \\ 1 & 0 & -\frac{P_{w,1}}{P_{w,3}} & 0 & 0 & 0 & 0 & 0 \\ 1 & 0 & 0 & -\frac{P_{w,1}}{P_{w,4}} & 0 & 0 & 0 & 0 \\ 0 & 0 & \frac{w}{b} & \frac{w}{b} & \frac{w}{b} & \frac{w}{b} & -1 & 0 \\ 0 & 0 & 0 & 0 & \xi & \xi-1 & 0 & 0 \\ 0 & 0 & 0 & 0 & 0 & 0 & 0 & \frac{1}{\gamma_{fiber}} \end{bmatrix}^{-1} \begin{bmatrix} -V_v \\ 1 - V_a - V_v - V_{fiber} \\ 0 \\ 0 \\ 0 \\ 0 \\ 0 \\ V_{fiber} \end{bmatrix}$$

Wherein, $K_{sst}$ and $K_{sst}'$ are the total surface area per unit weight (m²/kg) of the particles and fiber material;

$\gamma$ is the density (kg/m³) of each material;

t is the coating paste thickness (μm);

$\xi$ is the weight ratio (wt %) for the replacement of cement by blast furnace slag;

$P_{w,1}$ to $P_{w,4}$ are four mixed particle proportions of coarse aggregate(ca), fine aggregate(fa), fly ash and silica fume respectively: $P_{w,1}$ is the weight ratio of coarse aggregate(ca); $P_{w,2}$ is the weight ratio of fine aggregate(fa); $P_{w,3}$ is the weight ratio of fly ash; $P_{w,4}$ is the weight ratio of silica fume;

$V_v$ is the interstitial volume of the coarse aggregate(ca) and fine aggregate(fa), $U_{max}$ is maximum unit weight (kg/m³) of the dense mixed particle, $$V_v = 1 - U_{max}\left[\frac{P_{w,1}}{\gamma_{ca}} + \frac{P_{w,2}}{\gamma_{fa}}\right];$$

$V_a$ is the air content (%);

$V_{fiber}$ is the volume content (%) of the steel fiber material.

Figure 2:
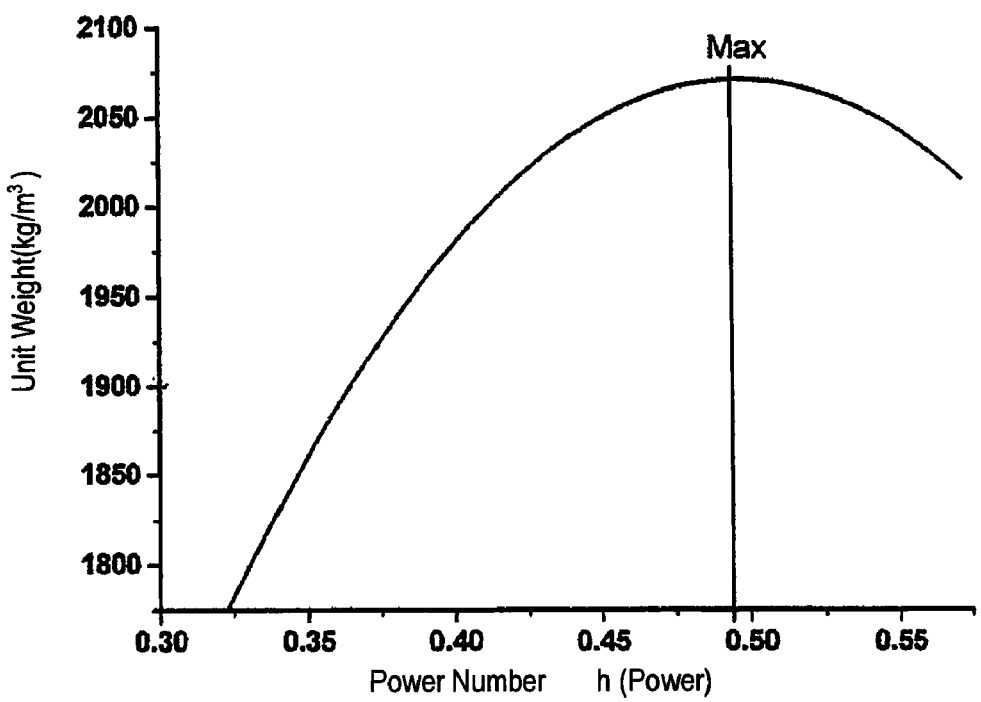
FIG. 2 depicts a mixed particle pack unit weight graph of an embodiment according to the present invention.
Figure 3:
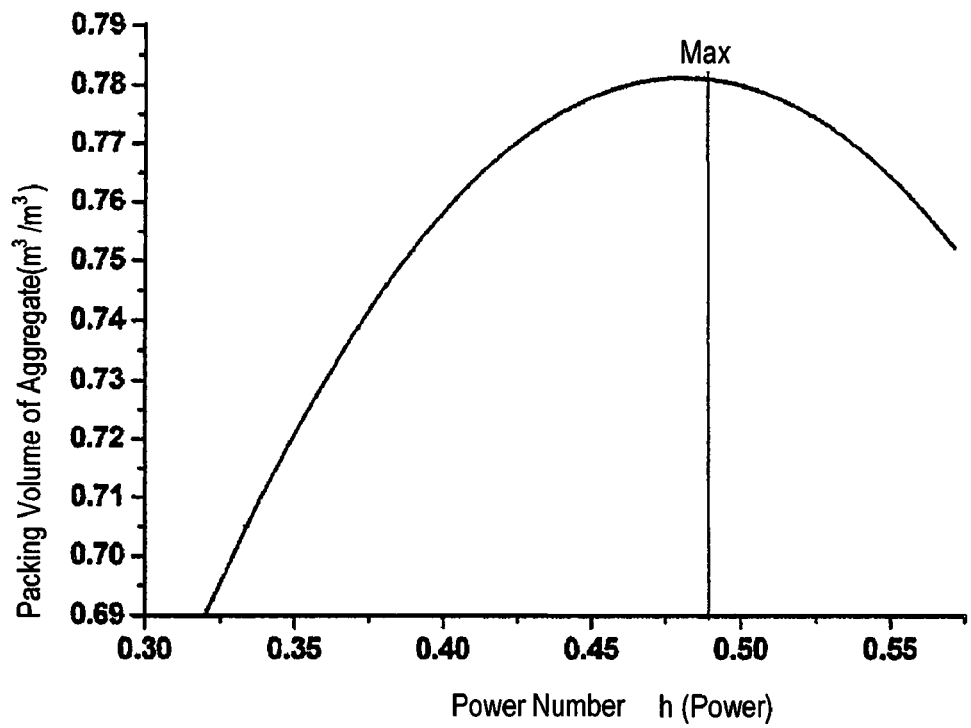
FIG. 3 depicts a mixed particle pack packing volume graph of an embodiment according to the present invention.
Figure 4:
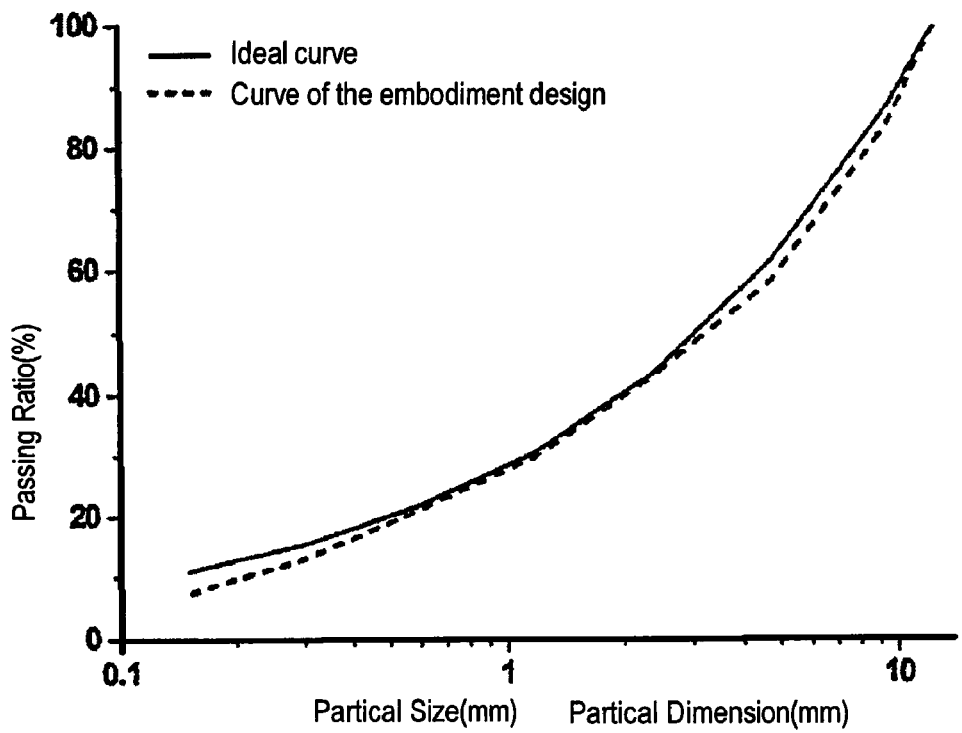
FIG. 4 depicts a sleeper material gradation curve for sleeper material of an embodiment approaching the ideal curve according to the present invention.

Referring to FIG. 1, which shows Fuller's ideal gradation curves (Fuller's curves), FIG. 2, which depicts a mixed particle unit weight graph of an embodiment, FIG. 3, which depicts a mixed particle dense packing volume graph of an embodiment, and FIG. 4, which depicts a sleeper material gradation curve for sleeper material of an embodiment approaching the ideal curve. In the aforementioned embodiments, Fuller's curve in conjunction with particle sieve analysis data to calculate particle framework ratio (as depicted in FIG. 1, in which P is particle content smaller than particle diameter d; d is the particle diameter of the particles; D is the nominal maximum particle diameter of the particles) is used, and according to actual packing results, the framework with maximum unit weight is found (as depicted in FIG. 2), as well as the maximum packing density (as depicted in FIG. 3) and the curve closest approaching the ideal grading curve (as depicted in FIG. 4), thereby giving usage proportions ($P_1$, $P_2$, $P_3$, $P_4$) for the coarse aggregate(ca), the fine aggregate(fa) and fly ash, and silica fume respectively of the sleeper and related precast component material.

Figure 5A:
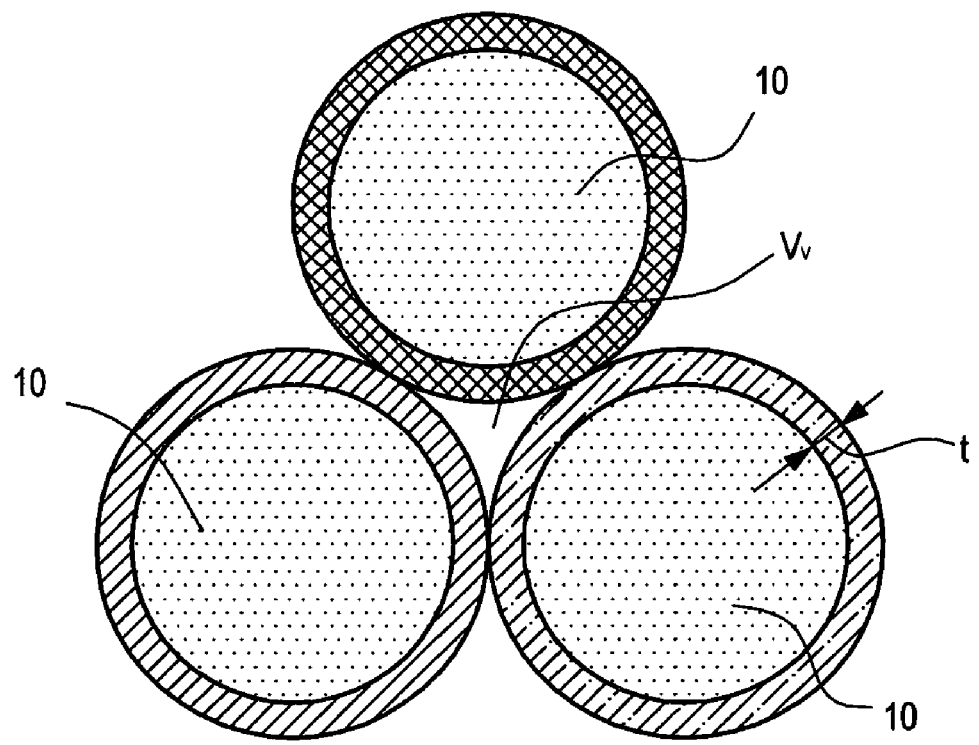
FIG. 5A depicts a schematic view of the coating paste thickness of particles according to an embodiment of the present invention.
Figure 5B:
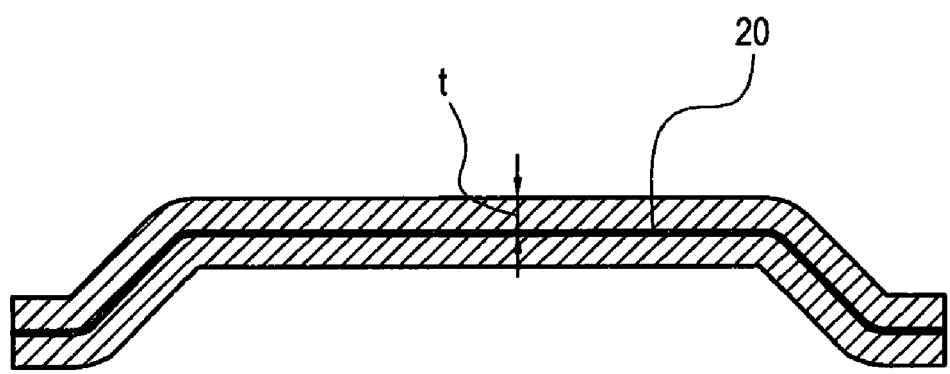
FIG. 5B depicts a schematic view of the coating paste thickness of steel fiber according to an embodiment of the present invention.

The embodiment assumes that the particle granules are spheres, and ascertains that the particles and fiber material unit weight contribute to the total surface area, and additionally introduces the concept of "coating paste thickness" (please refer to FIG. 5A, which shows a schematic view depicting paste coating thickness of particles according to an embodiment of the present invention, and FIG. 5B which shows a schematic view depicting coating paste thickness of steel fiber according to an embodiment of the present invention, wherein particles 10 in the drawings and surfaces of steel fiber 20 are coated by a lubricating paste thickness t, which is the minimum lubrication paste thickness, and Vv is a void between the particles 10). The concrete paste amount used ($V_p = V_v + S \cdot t$, wherein $V_p$ is the cement paste volume of the concrete; $V_v$ is the fine aggregate(fa)void ratio of coarse and fine aggregate(fa) mixture; S is the particle and fiber material surface area; t is the lubrication coating paste thickness) is decided based on the requirements of the sleeper structure and related precast concrete component. A computer program uses the already established matrix relational expression 1 for formula calculation to determine material usage (kg/m³) of the precast component material and related precast component material of the embodiment.

Precast concrete component material in the aforementioned embodiments was tested in a switch sleeper as follows:

Sleeper specification: 4 meters in length, 0.27 meters in width, and 0.22 meters in height. Prestressed pretension execution: each sleeper was laid with six steel linkages, and each linkage exerted 8~14 metric tons of prestressing force, totaling 48~84 metric tons. From the projected proportions of the aforementioned formula calculation method, three runs were carried out: altering the paste quality (different water-to-binder ratios), altering the paste volume (different paste volume of coating thickness) and using fixed paste quality, paste volume, but altering the steel fiber content. The properties of the fiber concrete observed are depicted in Table 1. This mixture design theory takes into consideration the mutual benefit of generating and control of materials, thus, fly ash and blast furnace slag are added, and additionally takes into consideration durability characteristics, thus, reducing, as far as possible, water usage and cement usage. As depicted in Table 1, the highest amount of cement usage is approximately 300 kg/m³, which differs significantly from the mixture design method of the American Concrete Institute (ACI); and in the item characteristic analysis of fresh concrete, regardless of whether the paste quality is altered (different water-to-binder ratios), the paste thickness is altered (different paste thickness coating thickness) or the paste quality and paste thickness are fixed, while altering fiber content is used, all are able to achieve a slump of 250±25 mm, slump flow of 600±100 mm and a flow time >30 seconds.

TABLE 1

Mixture proportion of steel fiber concrete (unit: kg/m³)

| Serial number | W/B | Thickness (μm) | Fiber (%) | Cement | Slag | Fly ash | Silica fume | Sand | Stone | Fiber | Water + SP |
|---|---|---|---|---|---|---|---|---|---|---|---|
| SFRC241005 | 0.24 | 10.00 | 0.50 | 304.48 | 101.49 | 95.16 | 32.99 | 856.07 | 940.66 | 39.00 | 128.19 |
| SFRC280505 | 0.28 | 5.00 | 0.50 | 256.13 | 85.38 | 97.39 | 33.77 | 876.11 | 962.67 | 39.00 | 132.35 |
| SFRC281005 | 0.28 | 10.00 | 0.50 | 278.02 | 92.67 | 95.16 | 32.99 | 856.07 | 940.66 | 39.00 | 139.68 |
| SFRC282005 | 0.28 | 20.00 | 0.50 | 318.93 | 106.31 | 91.00 | 31.55 | 818.64 | 899.53 | 39.00 | 153.38 |
| SFRC281000 | 0.28 | 10.00 | 0.00 | 277.46 | 92.49 | 95.85 | 33.23 | 862.26 | 947.45 | 0.00 | 139.73 |
| SFRC2810075 | 0.28 | 10.00 | 0.75 | 278.30 | 92.77 | 94.82 | 32.87 | 852.98 | 937.26 | 58.50 | 139.65 |
| SFRC281010 | 0.28 | 10.00 | 1.00 | 278.59 | 92.86 | 94.48 | 32.75 | 849.89 | 933.87 | 78.00 | 139.63 |
| SFRC2810125 | 0.28 | 10.00 | 1.25 | 278.87 | 92.96 | 94.13 | 32.64 | 846.80 | 930.47 | 97.50 | 139.61 |
| SFRC321005 | 0.32 | 10.00 | 0.50 | 254.85 | 84.95 | 95.16 | 32.99 | 856.07 | 940.66 | 39.00 | 149.74 |
| ACI2805 | 0.28 | — | 0.50 | 562.50 | 187.50 | 0.00 | 0.00 | 635.80 | 752.88 | 39.00 | 210.00 |

Figure 6:
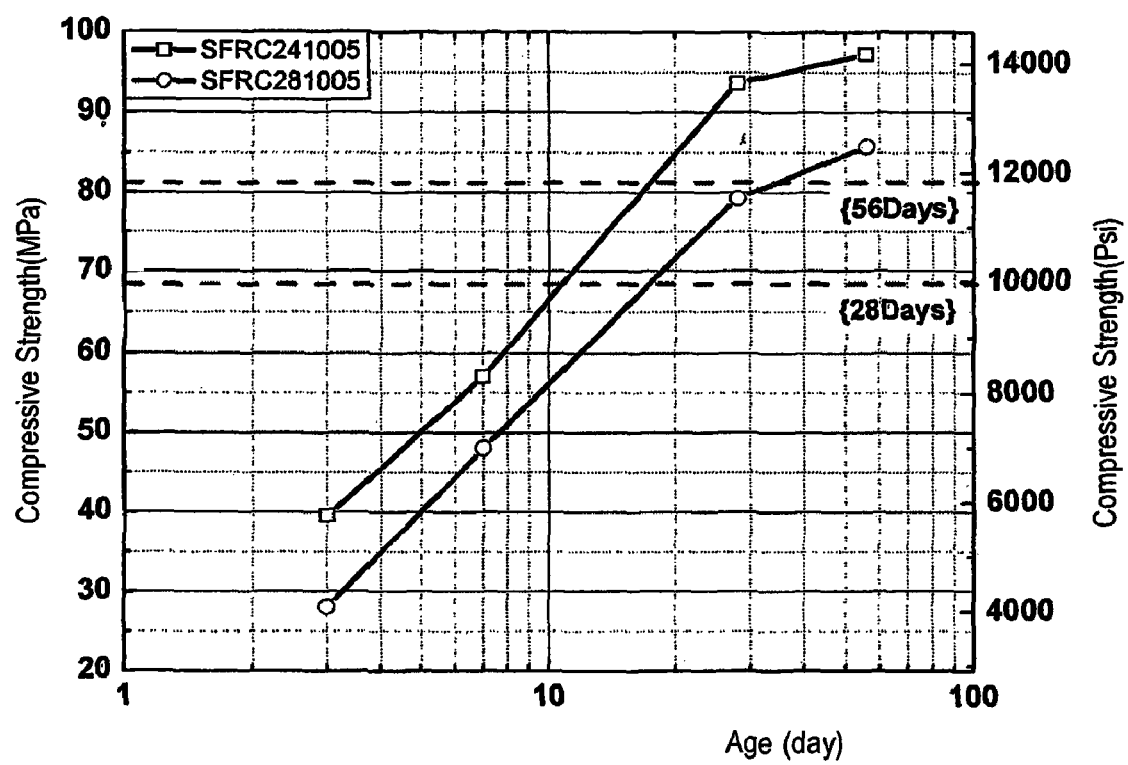
FIG. 6 depicts a compressive strength relation schema for a prestressed rail switch concrete sleeper according to an embodiment of the present invention.

In the mixture design of steel fiber concrete tested subjects of the aforementioned embodiments, Table 2 depicts engineering performance for test subjects having serial numbers SFRC241005 and SFRC281005. Compressive strength in the engineering performances was used as the most important guideline item for testing safety of the concrete, and magnitude of the structural strength of the sleeper bears upon the long-term usability and serviceable life thereof. The second set of mixture design test subjects of the embodiments all belong to high strength concrete mixture design, and it can be seen from FIG. 6 that the two sets of mixture design both exceeded 10,000 psi at 28 days, and both exceeded 12,000 psi at 56 days.

TABLE 2

PC sleeper quality.

| Sleeper | | | SFRC241005 | SFRC281005 |
|---|---|---|---|---|
| Quality Verification Items | Compressive strength (MPa) | 3 days | 39.58 | 28.10 |
| | | 7 days | 57.07 | 48.04 |
| | | 28 days | 93.70 | 79.24 |
| | | 56 days | 97.29 | 85.71 |
| | Cement strength efficiency (MPa/kg) | 3 days | 0.1300 | 0.1011 |
| | | 7 days | 0.1874 | 0.1728 |
| | | 28 days | 0.3077 | 0.2850 |
| | | 56 days | 0.3195 | 0.3083 |
| | Surface resistance (kΩ-cm) | 3 days | 3.16 | 2.74 |
| | | 7 days | 5.85 | 5.43 |
| | | 28 days | 43.09 | 34.53 |
| | | 56 days | 73.01 | 62.16 |
| | Ultrasonic pulse velocity (m/s) | 3 days | 4237 | 4067 |
| | | 7 days | 4497 | 4314 |
| | | 28 days | 4642 | 4547 |
| | | 56 days | 4716 | 4652 |

TABLE 2-continued

PC sleeper quality.

| Sleeper | | SFRC241005 | SFRC281005 |
|---|---|---|---|
| Dynamic Elasticity modulus (Gpa) | 3 days | 35.06 | 32.71 |
| | 7 days | 40.73 | 37.71 |
| | 28 days | 44.70 | 43.21 |
| | 56 days | 46.22 | 44.40 |

The present invention is characterized in that it uses the theoretical Fuller's ideal gradation curve (Fuller's curve) to calculate the appropriate mixing ratio of concrete particles, as well as the concept of introducing coating paste thickness to calculate concrete and paste quantities. Moreover, the present invention uses precise qualitative and quantitative means to control material mixture, thereby resolving the uncertainty in the manufacture of concrete brought about by manufacturers relying on complicated experimentation or the experience of operating personnel to decide material mixture proportion, and is able to obtain concrete having maximum density and stability, as well as ensuring the quality of concrete sleepers and related precast components.

Furthermore, formation of the design schema for the material mixture of concrete sleepers and related precast components of the present invention is based on established material selection standards and range of variables, and enables direct introduction into established matrix patterns to decide material usage, simplifying the method of concrete material formula calculation, and improving the quality of precast concrete components.

Using the densified mixture design method of the present invention enables a considerable reduction in the cement factor and cement usage, thereby substantially decreasing carbon dioxide emission, increasing concrete strength, overcoming the entangling problem of fiber material which would otherwise affect the workability thereof, and improving the durability of concrete sleepers and related precast concrete components through physical and chemical actions.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A precast concrete component material, applicable for use in a material of a structural, comprising:
    a coarse aggregate(ca), the coarse aggregate(ca) are 891 to 963 kg/m$^3$ of;
    a fine aggregate(fa), the fine aggregate(fa) are 811 to 876 kg/m$^3$ of;
    a pozzolan material, the pozzolan material comprises 90 to 97 kg/m$^3$ of fly ash, and 31 to 34 kg/m$^3$ of silica fume;
    a cementing material, the cementing material comprises 235 to 350 kg/m$^3$ of cement and 78 to 117 kg/m$^3$ of blast furnace slag;
    a water with 122 to 165 kg/m$^3$;
    a carboxylic acid based superplasticizer, the carboxylic acid based superplasticizer accounting for 0.7 to 2.0 wt % of the total usage of pozzolan and cementing material; and
    a steel fiber, the steel fiber accounting for 0.5 to 1.0% of the total volume.

2. The precast concrete component material according to claim 1, wherein the structure is a sleeper for transport tracks.

3. The precast concrete component material according to claim 1, wherein the coarse aggregate(ca) is a normal aggregate, which is machine-made stone or river stone having maximum particle diameter of 12.5 mm (½").

4. The precast concrete component material according to claim 1, wherein the fine aggregate(fa) is a normal aggregate, which is machine-made sand or river sand having a fineness modulus (F.M) lying between 2.8 to 3.2.

5. The precast concrete component material according to claim 1, wherein total usage of the pozzolan material and the cementing material used is in the range 444 to 588 kg/m$^3$.

6. The precast concrete component material according to claim 1, wherein two ends of the steel fiber are curved hooks, and the aspect ratio of the steel fiber lies between 50~70.

7. The precast concrete component material according to claim 1, wherein compressive strength of the concrete lies between 700 to 1,050 kgf/cm$^2$ (which is equivalent to 10,000 psi to 15,000 psi).

* * * * *